United States Patent [19]
Yarnell

[11] Patent Number: 5,549,188
[45] Date of Patent: Aug. 27, 1996

[54] SPLIT PIN FOR TRANSMISSION SYNCHRONIZER ASSEMBLY

[75] Inventor: James A. Yarnell, Temperance, Mich.

[73] Assignee: Dana Corporation, Toledo, Ohio

[21] Appl. No.: 333,080

[22] Filed: Nov. 1, 1994

[51] Int. Cl.$^6$ .................................................. F16D 11/00
[52] U.S. Cl. ........................................ 192/53.332; 74/339
[58] Field of Search ............................. 192/53 E, 53 F, 192/53, 331, 53.332; 74/339

[56] References Cited

U.S. PATENT DOCUMENTS

| | | | |
|---|---|---|---|
| 2,614,671 | 10/1952 | Eaton . | |
| 3,910,390 | 10/1975 | Eichinger | 192/53.332 |
| 4,018,319 | 4/1977 | Thomas | 192/53 E |
| 4,125,179 | 11/1978 | Cochran et al. . | |
| 4,462,489 | 7/1984 | Morscheck | 192/53 E |
| 4,624,352 | 11/1986 | Yarnell . | |
| 5,078,244 | 1/1992 | Olson | 192/63 E |
| 5,339,936 | 8/1994 | Lauer et al. | 192/53 E |

FOREIGN PATENT DOCUMENTS 933624  8/1963  United Kingdom ................ 192/53 E Primary Examiner—Charles A. Marmor
Assistant Examiner—Saul Rodriguez
Attorney, Agent, or Firm—MacMillan, Sobanski & Todd

[57] ABSTRACT

A transmission synchronizer assembly includes a pair of annular friction races mounted for movement co-axially with each other in a fixed, spaced apart relationship, with the spacing between the two friction races being at a fixed distance, the friction races being mounted for coaxial movement as a unit into and out of engagement with friction surfaces. An annular shiftable clutch collar is positioned between the two friction races, the clutch collar being mounted for coaxial movement with respect to the friction races to enable engagement of the clutch collar with transmission gears, the clutch collar having two or more circumferentially spaced orifices for receiving pins which are mounted through the orifices to resiliently urge the clutch collar into a roughly central position with respect to the friction races, the pins being shorter than the fixed distance between the two friction races, and not extending into the friction races.

11 Claims, 2 Drawing Sheets

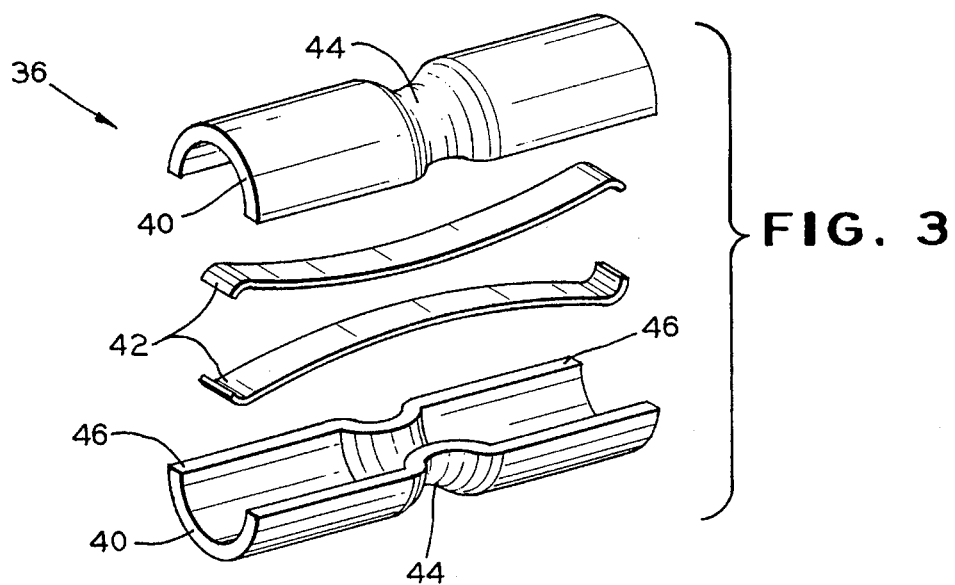
FIG. 3
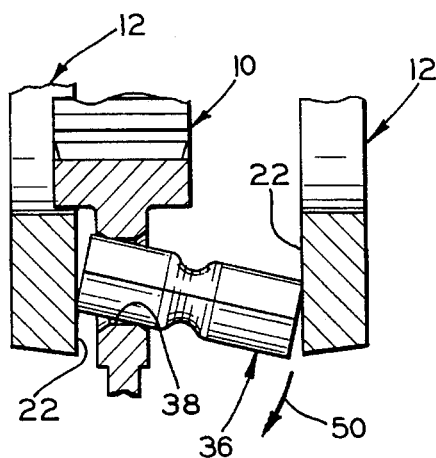
FIG. 4
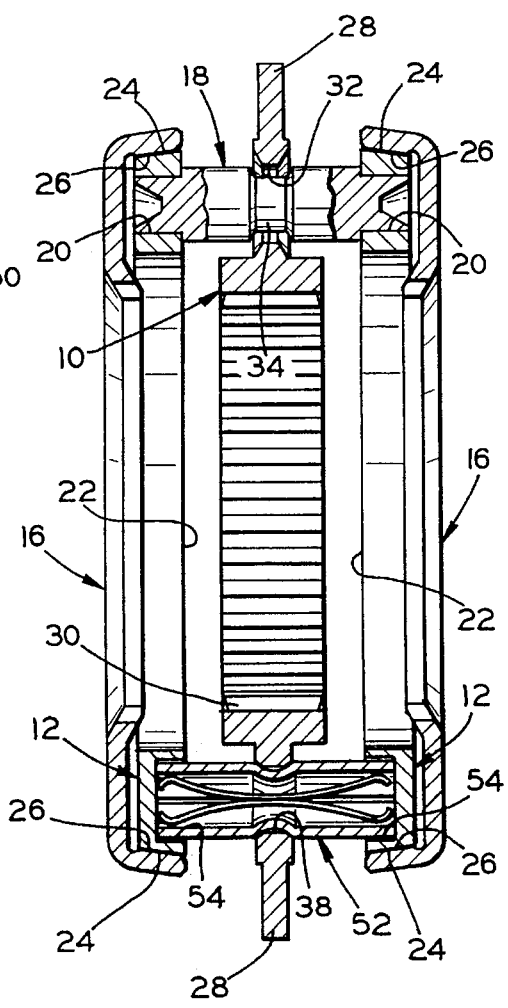
FIG. 5
FIG. 6

SPLIT PIN FOR TRANSMISSION SYNCHRONIZER ASSEMBLY

BACKGROUND OF THE INVENTION

This invention relates in general to synchronizer assemblies for manually operable vehicle transmissions and in particular to a split pin structure for supporting a movable clutch collar in such a transmission synchronizer assembly.

In most vehicles, a transmission is provided in the drive train between the engine and the driven wheels. As is well known, the transmission includes a plurality of gears which are selectively engaged to provide a plurality of speed reduction gear ratios between the input and the output thereof. One or more control members contained within the transmission are moved by a driver of the vehicle throughout a plurality of gear ratio positions for selecting the desired speed reduction. As a result, acceleration and deceleration of the vehicle can be achieved in a smooth and efficient manner.

In many transmissions, the control members are embodied as a plurality of clutch collars, each of which is movable between a neutral or non-gear engaging position and one or more gear engaging positions. Typically, each clutch collar includes a plurality of axially extending teeth which permit it to be splined onto a shaft contained within the transmission. As a result, the clutch collars are supported on the shaft for concurrent rotational movement, while permitting relative axial movement therebetween. A pair of gears are rotatably supported on the shaft on opposite sides of the clutch collar. Each of the gears is formed having a plurality of teeth which is complementary in size and shape to the plurality of teeth formed on the clutch collar. When the clutch collar is located in the neutral position, the plurality of teeth formed thereon does not engage the associated plurality of teeth formed on either of the adjacent gears. Therefore, no driving connection is provided between the shaft and either of such gears. When the clutch collar is moved axially toward one of the gears, the plurality of teeth formed thereon engages the associated plurality of teeth formed on that gear. Therefore, a driving connection is provided between the shaft and the selected gear.

As is well known in the art, the various gears and shafts contained within the transmission often rotate at different rotational speeds. If the clutch collar is moved from the neutral position to the gear engaging position when there is a significant difference between the respective rotational speeds of the clutch collar and the selected gear, undesirable clashing of the associated pluralities of teeth formed thereon will occur. In non-synchronized transmissions, the driver of the vehicle must use care and skill to operate the vehicle is such a manner as to prevent this from occurring. However, in some transmissions, the clutch collar is formed as part of a synchronizer assembly, which functions to automatically reduce the difference in the relative rotation speeds of the clutch collar and the selected gear when the clutch collar is axially moved as described above. Thus, in synchronized transmissions, the synchronizer assembly automatically minimizes the occurrence of this undesirable teeth clashing.

A typical transmission synchronizer assembly includes a pair of annular and co-axial friction races which are disposed on opposite sides of the clutch collar. The two friction races are rigidly fixed relative to one another in a spaced apart relationship, usually by a plurality of circumferentially spaced blocker pins. The clutch collar has a plurality of axially extending openings formed therethrough, through which the blocker pins extend. Thus, the clutch collar is supported between the two friction races for rotation therewith, yet can move axially relative thereto. The friction races are adapted to engage cooperating friction faces provided on each of the adjacent gears of the transmission before the clutch collar is moved to a gear engaging position so as to reduce the difference in the relative rotation speeds of the clutch collar and the selected gear.

Means are provided for releasably retaining the clutch collar in a central position between the two friction races. To accomplish this, it is known to provide a plurality of spring pins which extend axially between the two friction races. Typically, the spring pins are located circumferentially between adjacent ones of the blocker pins and extend through respective axially extending apertures formed through the clutch collar. Annular recesses are formed in the outer surfaces of the spring pins near the centers thereof. The recesses of the spring pins resiliently engage the clutch collar and thereby function to releasably retain the clutch collar in the center position between the two friction races.

A number of spring pin structures are known in the art for use in transmission synchronizers of this general type. Although known spring pins function satisfactorily, they have been found to be relatively expensive to manufacture and assemble. Known types of spring pins include flat stamped spring loaded members, spring loaded plungers, and split-pin members consisting of a pair of semi-cylindrical halves which are biased apart by separate resilient springs, such as leaf springs. The ends of these known spring pins have been mounted in recesses formed in the opposed, inwardly facing surfaces of the friction races, thereby necessitating expensive machining. Also, it has been found that the resilient spring structures contained within known spring pins are subject to fatigue. Thus, it would be desirable to provide an improved structure for a transmission synchronizer spring pin which is less expensive than known designs, and further is less subject to fatigue than conventional designs.

SUMMARY OF THE INVENTION

This invention relates to improved structure for a transmission synchronizer assembly including a plurality of spring pins for releasably retaining the clutch collar in a central position between a pair of annular friction races. The friction races are connected together by a plurality of blocker pins in a co-axial spaced apart relationship. An annular clutch collar is supported on the blocker pins between the two friction races for rotational movement therewith and for axial movement relative thereto. The clutch collar has a plurality of circumferentially spaced orifices formed therethrough for receiving respective spring pins. The spring pins extend through the orifices to resiliently retain the clutch collar into a central position between the friction races. In a first embodiment of the invention, the spring pins are formed from two concave members, with the concave portions facing each other. The spring pins are shorter than the fixed distance between the friction races and do not extend into the friction races. An annular groove is formed in each of the spring pins centrally between the two ends thereof to provide a central detent position for the clutch collar. Means are provided for biasing the two concave members away from each other to resiliently engage the clutch collar and releasably retain it in the central position. The orifices formed through the clutch collar and the spring pins are sized to prevent substantial rotation of the spring pins within the orifices, thereby preventing the spring pins from falling out of the orifices or jamming. The two split pin halves are preferably formed from a stamped metallic material to reduce the cost of the assembly.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is an enlarged exploded perspective view of the one of the split pins of the transmission synchronizer illustrated in FIG. 1.

FIG. 4 is an enlarged sectional elevational view of the split pin and the portion of the clutch collar including the split pin orifice illustrated in FIG. 1 prior to insertion of the split pin into the split pin orifice.

FIG. 5 is an enlarged sectional elevational view similar to FIG. 4 after insertion of the split pin into the split pin orifice of the clutch collar.

FIG. 6 is a sectional elevational view of a second embodiment of a transmission synchronizer in accordance with this invention, also including a pair of cooperating clutching rings on opposite sides of the synchronizer.

DETAILED DESCRIPTION OF THE PREFERRED EMBODIMENTS

Figure 1:
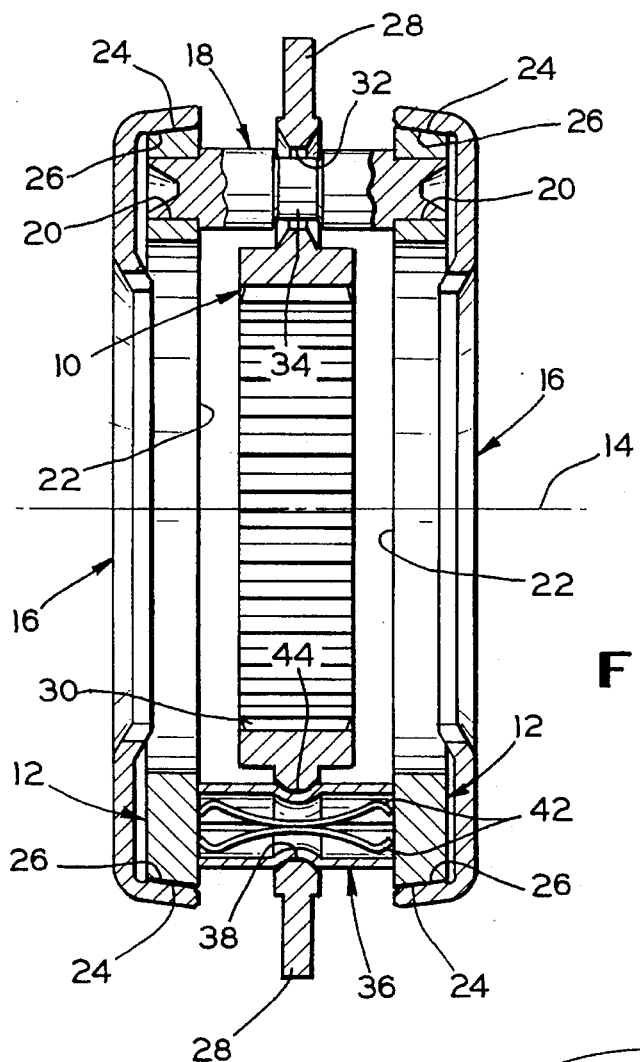
FIG. 1 is a sectional elevational view of a first embodiment of a transmission synchronizer assembly in accordance with this invention, wherein a pair of cooperating clutching rings are shown on opposite sides of the synchronizer.

Referring now to the drawings, there is illustrated in FIG. 1 a first embodiment of a transmission synchronizer assembly in accordance with this invention. The synchronizer includes a clutch collar 10 and left and right friction races 12. The friction races 12 are rigidly secured together in a spaced apart co-axial relationship by any suitable means, such as by blocker pins 18. Thus, the axial spacing between the two friction races 12 is a fixed distance. Preferably, there are three equidistantly spaced blocker pins 18 provided about the circumferences of the two friction races 12. The ends of the blocker pins 18 are press fit into respective recesses 20 formed in the axially inwardly facing surfaces 22 of the two friction races 12. As a result, the two friction races 12 are connected together for movement as a unit left or right along the axis of rotation 14.

The clutch collar 10 has a plurality of blocker pin orifices 32 formed therethrough, through which the blocker pins 18 extend. Thus, the clutch collar 10 is supported on the blocker pins 18 for co-axial rotation about the axis of rotation 14 with the friction rings 12, as mentioned above. The blocker pins 18 are preferably formed having conventional central detents 34 which prevent lateral movement of the clutch collar 10 from a central position between the two friction races 12 when there is rotational torque on the clutch collar 10 relative to the friction races 12.

As is well known in the art, the synchronizer forms part of an otherwise conventional vehicle transmission (not shown), which includes a plurality of gears which are selectively engaged to provide a plurality of speed reduction gear ratios between the input and the output thereof. A pair of clutching rings 16 are secured to two of these gears (not shown), which are co-axially disposed on opposite axial sides of the clutch collar 10. The friction races 12 have respective tapered friction surfaces 24 formed thereon which are adapted to frictionally engage corresponding tapered friction surfaces 26 formed on the clutching rings 16. As is well known, axial movement of the friction races 12 of the synchronizer along the axis of rotation 14 causes one of the friction surfaces 24 formed thereon to engage the corresponding one of the friction surfaces 26 formed on the clutching rings 16. As a result of this engagement, the clutching ring 16 and its associated gear are frictionally braked to assume roughly the same rotational speed as that of the friction race 12.

Figure 2:
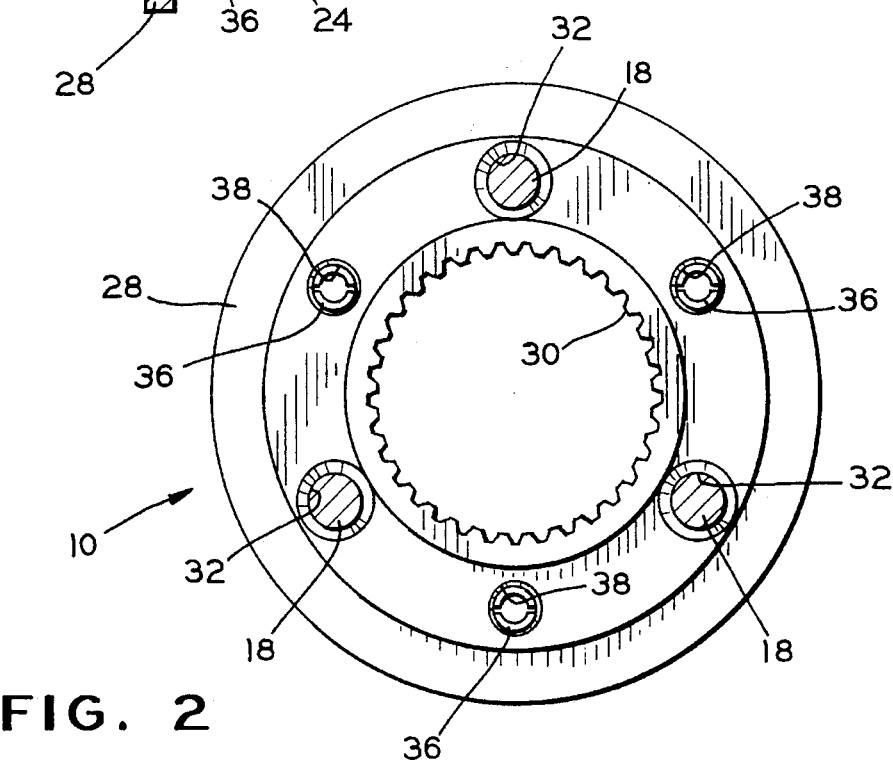
FIG. 2 is a side elevational view of the clutch collar of the transmission synchronizer illustrated in FIG. 1.

As shown in both FIGS. 1 and 2, the clutch collar 10 has an annular radial flange 28. The flange 28 is adapted to be engaged by a conventional shift fork (not shown) of the transmission to permit an operator to move the clutch collar 10 and the other components of the synchronizer axially (toward the left and right, when viewing FIG. 1) so as to select and engage one of the two gears disposed on the opposite axial sides thereof, as described above. The clutch collar 10 is supported on the blocker pins 18 for co-axial rotation about the axis of rotation 14 with the friction rings 12. However, in a manner explained below, the clutch collar 10 can be moved axially relative to the friction races 12. A plurality of axially extending clutch teeth 30 are provided about the circumference of the inner periphery of the clutch collar 10. The teeth 30 are provided to permit the clutch collar 10 to be splined onto a shaft (not shown) contained within the transmission.

The clutch collar 10 includes a plurality (three in the illustrated embodiment) of spring pins which are provided to releasably retain the clutch collar 10 in a central position between the two friction races 12. In the first embodiment illustrated in FIGS. 1 through 5, the spring pins are embodied as split pins 36 which extend through respective split pin orifices 38 formed through the clutch collar 10. The split pins 36 are resiliently compressible and are preferably formed from two split pin halves 40 having a biasing means positioned therebetween to urge the split pin halves 40 outwardly apart from one another. The two halves 40 of the split pins 36 are concave in shape, wherein the concave portions face one another. Preferably, the split pins 36 have generally cylindrical interior surfaces. In the illustrated embodiment, the biasing means is a pair of leaf springs 42 disposed between the two halves 40 of the split pin 36. However, the biasing means can be embodied as any suitable means for resiliently urging the two split pin halves 40 apart from one another, including other types of springs, compressible bladders, or spring-like portions formed on the split pin halves 40 themselves.

As shown in FIG. 3, the outer surface of the split pin 36 is formed having an annular groove or detent 44 which is located centrally between the opposed axial ends 46 thereof. When the clutch collar 10 is in the central position between the two friction races 12, the split pin orifice 38 is aligned with the split pin detent 44. The two halves 40 of the split pin 36 are urged apart from one another by a maximum distance. Any axial movement of the clutch collar 10 away from the central position will cause compression of the two halves 40 of the split pin 36 toward one another. Since compression of the two halves 40 of the split pin 36 is resisted by the urging of the leaf springs 42, a force of some magnitude is required to compress the leaf spring 42 together to permit the clutch collar 10 to move axially relative to the friction races 12. The depth of the detent 44, the slope or angle of the bevel or sides of the detent 44, and the magnitude of the biasing force generated by the leaf springs 42 will determine the amount of force which must be exerted to move the clutch collar 10 axially out of the central position relative to the friction races 12.

As shown in FIG. 4, the split pin orifice 38 has an inner diameter D and an axial thickness x. The ends of the split pin orifice 38 are preferably provided with chamfered portions 48 to facilitate the relative axial movement of the clutch collar 10 and the split pin 36. The split pin 36 itself has an outer diameter d, which is the minimum diameter of the split pin 36 when the two split pin halves 40 are fully compressed together. A highly desirable feature of this invention is that the split pin 36 will not fall out or rotate out of the split pin orifice in the direction of rotation arrow 50, as shown in FIGS. 4 and 5. It is also important to prevent jamming of the split pin 36 by rotation. This rotation was prevented in prior art devices by drilling recesses in the axially inwardly facing surfaces of the friction races 12 and providing longer split pins which extended into such recesses. The same result is accomplished in this invention by making the making the split pins 36 shorter in the axial direction, i.e., shorter than the fixed distance between the two friction races 12, and by preventing substantial rotation of the split pin 36 within the split pin orifice 38. This can be accomplished by providing that minimum split pin diameter d be sufficiently close in size to the size of the split pin orifice D to prevent substantial rotation of the split pins 36 within the orifices 38, thereby preventing the split pins 36 from falling out of the orifices 38. This arrangement avoids the necessity of having the split pins 36 extend into recesses formed in the axially inwardly facing surfaces of the friction races 12. Another expression of the anti-rotation feature of this invention is that the relationship between x, D and d is such that substantial rotation of the split pins 36 within the orifices 38 is prevented, thereby preventing the split pins 36 from falling out of the orifices 38 or becoming jammed, where the axial thickness of the split pin orifices 38 is x, the split pin orifices 38 in the clutch collar 10 have an inner diameter D, and the split pins 36 are linear with two ends, the ends having a minimum outer diameter d. For example, for a split pin 36 which is 1.25 inches long and has a minimum outer diameter d of about 0.435 inch, a preferred relationship would include a split pin orifice 38 having an axial thickness x of about 0.166 inch and a split pin orifice having an inner diameter D of about 0.455 inch.

A second embodiment of this invention is illustrated in FIG. 6. In this second embodiment, a modified split pin 52 is provided which is axially longer than the fixed distance between the two friction races 12. The ends of the modified split pin 52 extend into respective recesses 54 formed in the inwardly facing surfaces of the friction races 12. The modified split pins 54 are formed from stamped steel, rather than of heat treated powdered metal construction.

The operation of the two embodiments of the synchronizer assembly of this invention is essentially the same as known synchronizers. When it is desired to engage a gear for use, the shift fork is moved by the operator of the vehicle in such a manner as to cause axial sliding movement of the clutch collar 10 out of the neutral position toward one of the two adjacent gears. Because of the resilient engagement of the spring pins 36 within the orifices 38, the two friction races 12 initially move axially with the clutch collar 10 as a unit. Such joint axial movement as a unit continues until the friction surface 24 of one of the friction races 12 engages the friction surface 26 of the selected adjacent gear. The frictional engagement of the friction surfaces 24 and 26 causes synchronization of the rotational speeds of the clutch collar 10 and the selected adjacent gear. This synchronizing action occurs before the plurality of axially extending clutch teeth 30 engages the associated plurality of teeth formed on the selected adjacent gear. As a result, the difference between the rotational speeds of the clutch collar 10 and the selected adjacent gear is reduced to a minimum.

Further axial movement of the clutch collar 10 causes the clutch collar 10 to move axially relative to the friction races 12. Thus, the clutch collar 10 will compress the two halves 40 of each of the split pins 36 and slide axially relative thereto. As a result, the plurality of axially extending clutch teeth 30 is moved into engagement with the associated plurality of teeth formed on the selected adjacent gear. Thus, the selection and engagement of the selected gear ratio is accomplished.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A transmission synchronizer assembly comprising:

a pair of annular friction races mounted for movement co-axially with each other in a fixed, spaced apart relationship, with the spacing between the two friction races being at a fixed distance, the friction races being mounted for coaxial movement as a unit into and out of engagement with friction surfaces;

an annular shiftable clutch collar positioned between the two friction races, the clutch collar being mounted for coaxial movement with respect to the friction races to enable engagement of the clutch collar with transmission gears, the clutch collar having two or more circumferentially spaced orifices for receiving pins therethrough; and, two or more pins mounted through the orifices to resiliently urge the clutch collar into a roughly central position with respect to the friction races, the pins being shorter than said fixed distance, and not extending into the friction races.

2. The transmission synchronizer assembly defined in claim 1 in which the pins are comprised of two mated concave members, with the concave portions facing each other, and the pins further including means for biasing the two concave members away from each other.

3. The transmission synchronizer assembly defined in claim 2 in which the pins are linear with two ends, and the pins have an annular groove positioned centrally between the two ends of the pins.

4. The transmission synchronizer assembly defined in claim 2 in which the means for biasing comprises two springs.

5. The transmission synchronizer assembly defined in claim 2 in which the pins are comprised of stamped steel.

6. The transmission synchronizer assembly defined in claim 1 in which the orifices in the clutch collar have a diameter D, and the pins are linear with two ends, the ends having a minimum diameter d, and where d is sufficiently close to D to prevent substantial rotation of the pins within the orifices, thereby preventing the pins from falling out of the orifices or jamming.

7. The transmission synchronizer assembly defined in claim 1 in which the thickness of the orifices in the clutch collar is x, the orifices in the clutch collar have a diameter D, and the pins are linear with two ends, the ends having a minimum diameter d, and where the relationship between x, D and d is such that substantial rotation of the pins within the orifices is prevented, thereby preventing the pins from falling out of the orifices or jamming.

8. A transmission synchronizer assembly comprising:

a pair of annular friction races mounted for movement co-axially with each other in a fixed, spaced apart relationship, with the spacing between the two friction races being at a fixed distance, the friction races being mounted for coaxial movement as a unit into and out of engagement with friction surfaces;

an annular shiftable clutch collar positioned between the two friction races, the clutch collar being mounted for coaxial movement with respect to the friction races to enable engagement of the clutch collar with transmission gears, the clutch collar having two or more circumferentially spaced orifices for receiving pins therethrough; and, two or more pins mounted through the orifices to resiliently urge the clutch collar into a roughly central position with respect to the friction races, the pins being shorter than said fixed distance, and not extending into the friction races, the pins being comprised of two mated concave members, with the concave portions facing each other, the pins further including means for biasing the two concave members away from each other, and the pins being linear with two ends and having an annular groove positioned centrally between the two ends of the pins.

9. The transmission synchronizer assembly defined in claim 8 in which the pins are comprised of stamped steel.

10. The transmission synchronizer assembly defined in claim 8 in which the orifices in the clutch collar have a diameter D, and the pins are linear with two ends, the ends having a minimum diameter d, and where d is sufficiently close to D to prevent substantial rotation of the pins within the orifices, thereby preventing the pins from falling out of the orifices or jamming.

11. The transmission synchronizer assembly defined in claim 8 in which the thickness of the orifices in the clutch collar is x, the orifices in the clutch collar have a diameter D, and the pins are linear with two ends, the ends having a minimum diameter d, and where the relationship between x, D and d is such that substantial rotation of the pins within the orifices is prevented, thereby preventing the pins from falling out of the orifices or jamming.

* * * * *